(12) United States Patent
Lu et al.

(10) Patent No.: US 10,056,118 B2
(45) Date of Patent: Aug. 21, 2018

(54) CARRYING APPARATUS USED FOR MEMORY STORAGE UNIT

(71) Applicant: Super Micro Computer Inc., San Jose, CA (US)

(72) Inventors: Chia-Cheng Lu, San Jose, CA (US); Ken-Sheng Lin, San Jose, CA (US); Richard S. Chen, San Jose, CA (US)

(73) Assignee: SUPER MICRO COMPUTER INC., San Jose, CA (US)

( * ) Notice: Subject to any disclaimer, the term of this patent is extended or adjusted under 35 U.S.C. 154(b) by 16 days.

(21) Appl. No.: 15/494,175

(22) Filed: Apr. 21, 2017

(65) Prior Publication Data
US 2018/0210518 A1    Jul. 26, 2018

(30) Foreign Application Priority Data
Jan. 25, 2017 (TW) .............................. 106201494 U

(51) Int. Cl.
*G11B 33/12* (2006.01)
*G06F 1/18* (2006.01)
*F16B 2/10* (2006.01)
*F16B 2/18* (2006.01)

(52) U.S. Cl.
CPC .............. *G11B 33/124* (2013.01); *F16B 2/10* (2013.01); *F16B 2/185* (2013.01); *G06F 1/187* (2013.01); *G11B 33/12* (2013.01)

(58) Field of Classification Search
CPC ....... G06F 1/187; G11B 33/124; G11B 33/12; F16B 2/10

USPC ........................................ 361/379.33, 379.37
See application file for complete search history.

(56) References Cited

U.S. PATENT DOCUMENTS

| | | | | |
|---|---|---|---|---|
| 6,058,016 A * | 5/2000 | Anderson | ................ | G06F 1/184 312/223.2 |
| 6,320,120 B1 * | 11/2001 | Van Haaster | ........ | H05K 9/0016 174/17 CT |
| 7,016,190 B1 * | 3/2006 | Chang | ..................... | G06F 1/184 235/381 |
| 7,492,586 B2 * | 2/2009 | Peng | .................... | G11B 33/124 248/694 |
| 7,495,902 B2 * | 2/2009 | Connelly, Jr. | .......... | G11B 33/08 206/701 |
| 7,684,181 B2 * | 3/2010 | Peng | .................... | G11B 33/123 312/333 |
| 7,684,182 B2 * | 3/2010 | Zhang | .................. | G11B 33/123 16/258 |
| 7,701,703 B2 * | 4/2010 | Peng | .................... | G11B 33/124 248/633 |

(Continued)

*Primary Examiner* — Eret C McNichols
(74) *Attorney, Agent, or Firm* — Chun-Ming Shih; HDLS IPR Services

(57) ABSTRACT

A carrying apparatus for clamping the side edges of a memory storage unit includes a base part, a fixed arm, and a holding arm. The base part is disposed corresponding to a first side edge of the memory storage unit and has a fixed end and a pivot end. The fixed arm extends from the fixed end of the base part. The holding arm is pivoted on the pivot end of the base part and spaced with the fixed arm. The base part has a working space in which an elastic element is disposed. The holding arm has a stop end extending into the working space. Thus, the elastic element exerts a force on the stop end such that the holding arm moves toward and clamps the third side edge of the memory storage unit.

16 Claims, 7 Drawing Sheets

(56) References Cited

U.S. PATENT DOCUMENTS

| | | | | |
|---|---|---|---|---|
| 7,701,707 | B2* | 4/2010 | Peng | G11B 33/124 248/618 |
| 7,729,110 | B2* | 6/2010 | Zhang | G11B 33/12 248/633 |
| 7,881,052 | B2* | 2/2011 | Crippen | G11B 33/122 312/223.1 |
| 8,159,817 | B2* | 4/2012 | Lin | F16C 29/02 312/223.1 |
| 8,246,000 | B2* | 8/2012 | Peng | G11B 33/124 248/682 |
| 8,251,339 | B2* | 8/2012 | Peng | G06F 1/187 248/682 |
| 8,369,077 | B2* | 2/2013 | Peng | G06F 1/187 248/27.1 |
| 8,456,832 | B1* | 6/2013 | Brigham, Jr. | G06F 1/187 361/679.33 |
| 8,472,180 | B2* | 6/2013 | Gong | G11B 33/124 248/27.1 |
| 8,547,690 | B2* | 10/2013 | Hu | G06F 1/187 206/308.1 |
| 8,644,015 | B2* | 2/2014 | Lin | G06F 1/187 248/274.1 |
| 8,749,966 | B1* | 6/2014 | Boudreau | G06F 1/187 361/679.33 |
| 9,269,400 | B2* | 2/2016 | Degay | G11B 33/00 |
| 2008/0205026 | A1* | 8/2008 | Gallarelli | G11B 33/12 361/818 |
| 2009/0101781 | A1* | 4/2009 | Peng | G11B 33/08 248/316.1 |
| 2010/0321879 | A1* | 12/2010 | Peng | G06F 1/187 361/679.33 |
| 2013/0314868 | A1* | 11/2013 | Tsai | G11B 33/124 361/679.33 |

* cited by examiner

CARRYING APPARATUS USED FOR MEMORY STORAGE UNIT

BACKGROUND OF THE INVENTION

Field of the Invention

The present invention relates to computer peripherals and in particular to a carrying apparatus used for a memory storage unit.

Description of Prior Art

A traditional memory storage unit such as a hard disk drive used in a computer system usually utilizes the removable arrangement for convenient expansion or as options and thus a removable apparatus for disposing the memory storage unit like the hard disk drive is provided. In this way, the memory storage unit and the removable apparatus can be installed simultaneously in the computer system and can be removed simultaneously when replacement.

However, because the modern 3C components have the trend towards thinning, the removable apparatus gets thinning accordingly. When the memory storage unit itself is required to get thinner without an increasing thickness and without the loss of assembly convenience, it's difficult to achieve the thinning due to the excessive volume occupied by the traditional removable apparatus. Besides, it cannot achieve the expected result for the installation of the memory storage unit only by reducing the size thereof.

In view of this, the inventor pays special attention to research with the application of related theory and tries to improve and overcome the above disadvantages regarding the above related art. Finally, the present invention, which is reasonably designed and improves the above disadvantages, is proposed by the inventor.

SUMMARY OF THE INVENTION

A main objective of the present invention is to provide a carrying apparatus used for a memory storage unit, which uses the flexible clamping force to make an embedded design on the flexible mechanical components without increasing sizes and keeps sufficient a clamping force on the memory storage unit.

Another objective of the present invention is to provide a carrying apparatus used for a memory storage unit, which is applicable to a thinned memory storage unit such as a hard disk drive with a thickness below 7 mm.

To achieve the above objectives, the present invention provides a carrying apparatus used for clamping the side edges of a memory storage unit. The carrying apparatus comprises a base part, a fixed arm, and a holding arm. The base part is disposed corresponding to a first side edge of the memory storage unit and has a fixed end and a pivot end. The fixed arm extends from the fixed end of the base part. The holding arm is pivoted on the pivot end of the base part and is spaced with the fixed arm. The base part is provided with a working space in which an elastic element is disposed. The holding arm is provided with a stop end extending into the working space. In this working space, the elastic element exerts a force on the stop end such that the holding arm moves toward and clamps the third side edge of the memory storage unit. In this way, by means of the sufficient clamping force provided by the fixed arm and the holding arm, the memory storage unit can be disposed on the carrying apparatus.

DETAILED DESCRIPTION OF THE INVENTION

The detailed description and technical details of the present invention will be explained below with reference to accompanying figures. However, the accompanying figures are only for reference and explanation, but not to limit the scope of the present invention.

Figure 1:
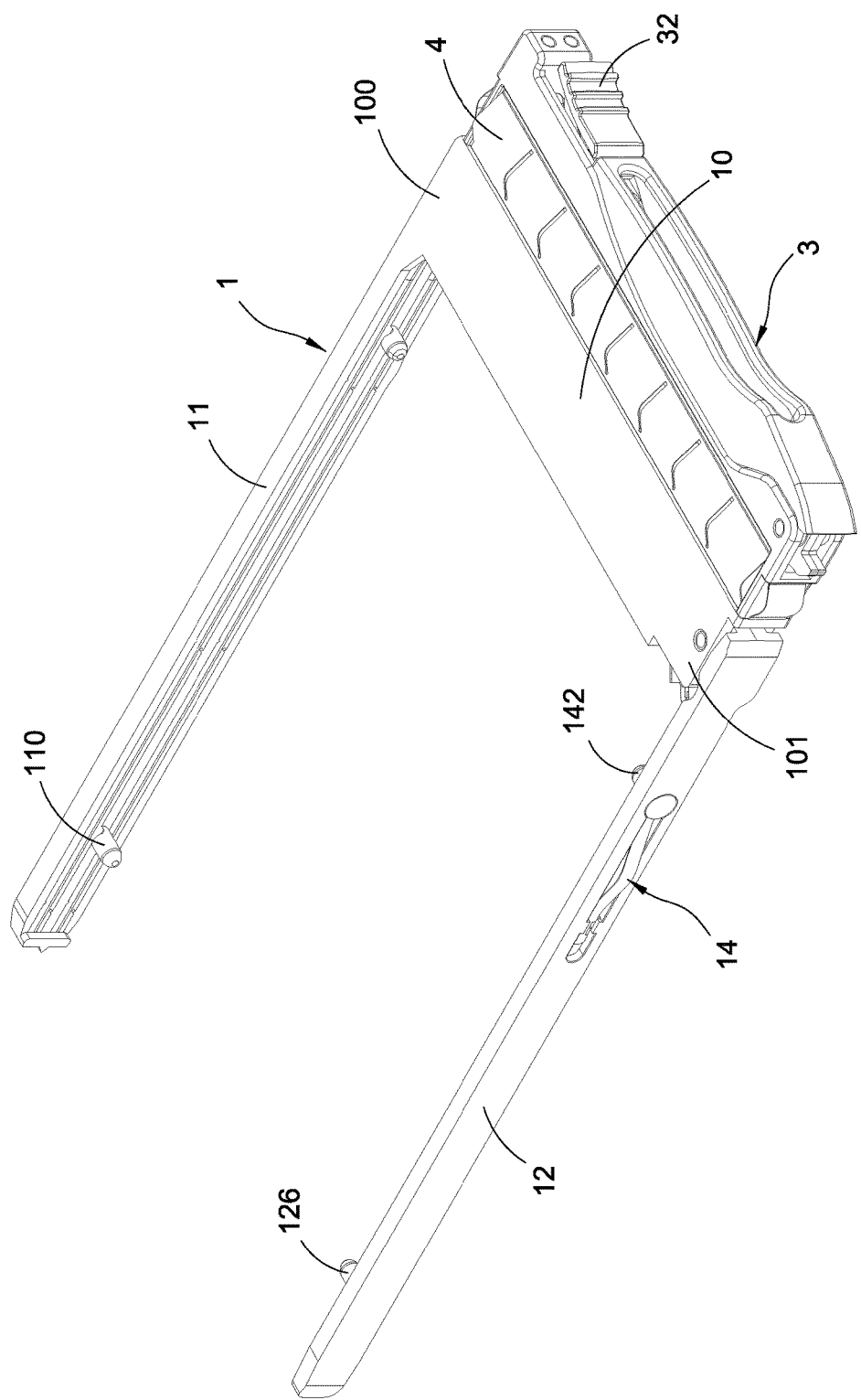
FIG. 1 is a perspective view of the present invention.
Figure 2:
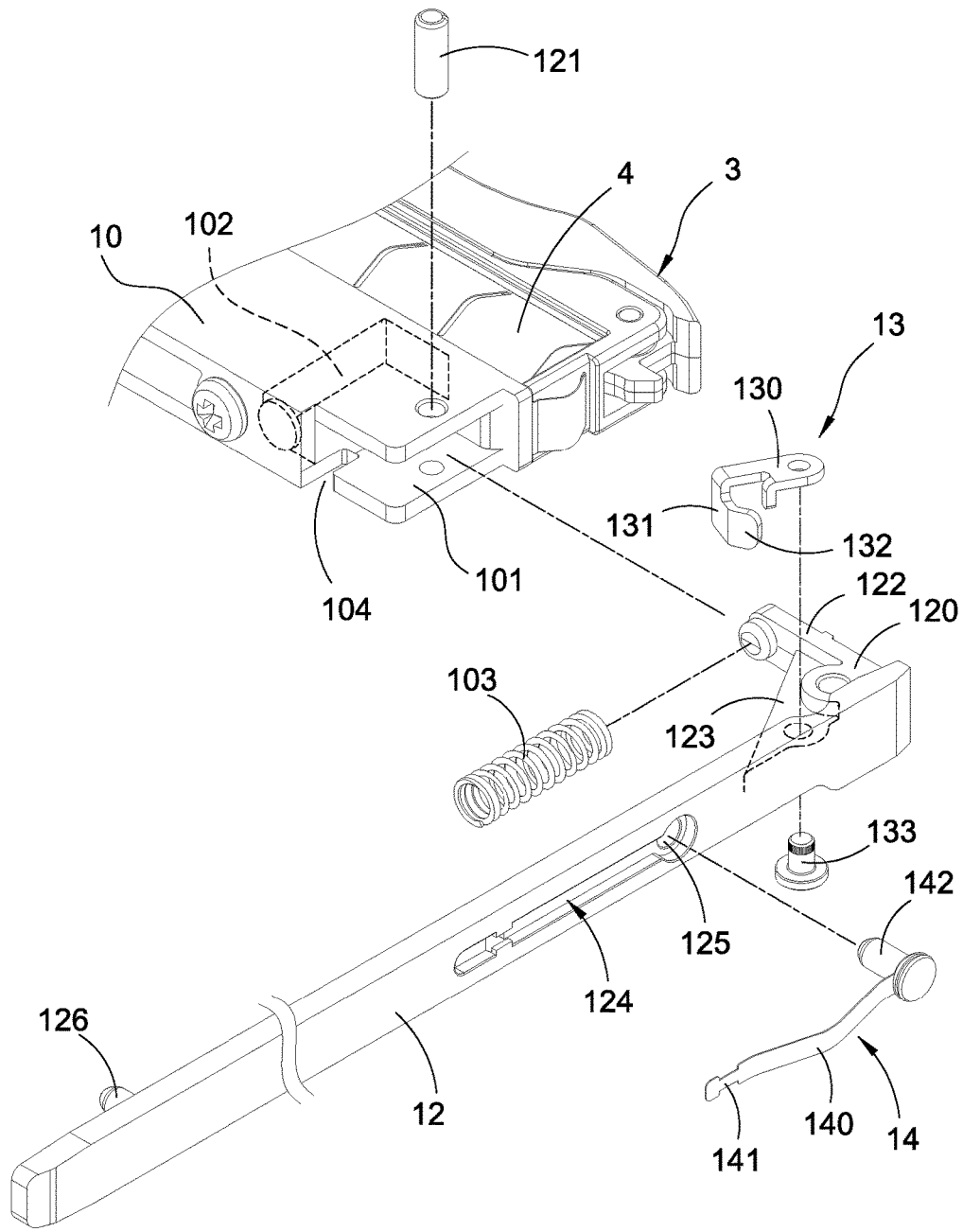
FIG. 2 is a partial perspective exploded view of the present invention.
Figure 6:
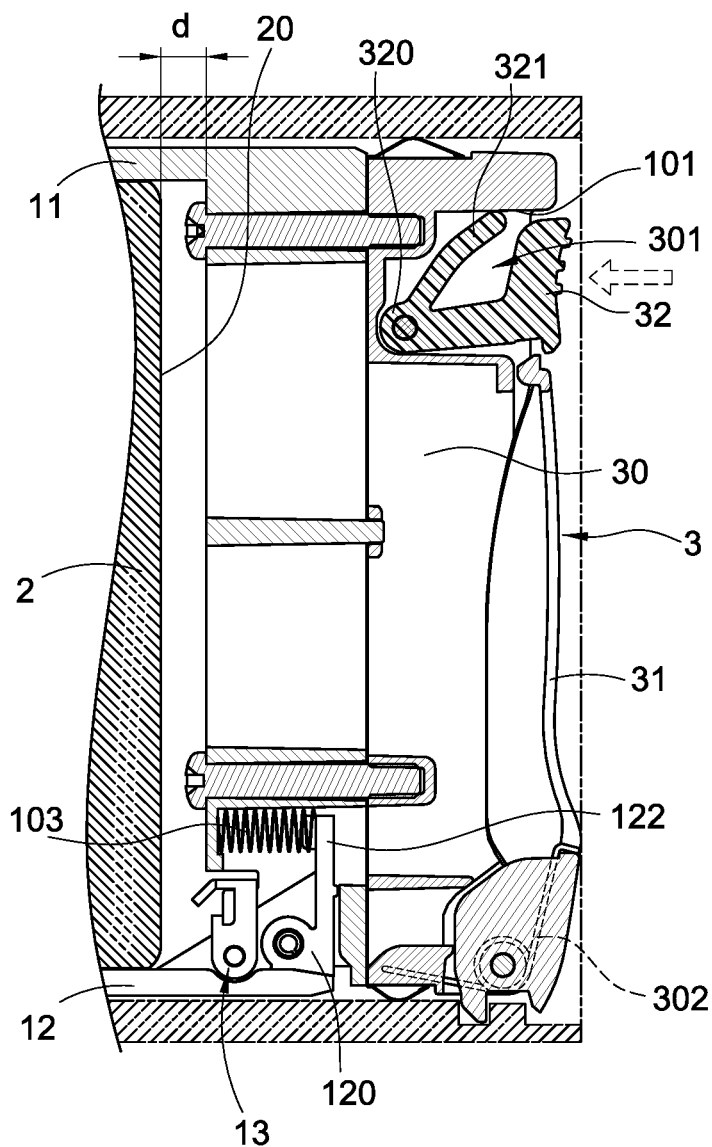
FIG. 6 is a schematic view of installing the memory storage unit and the carrying apparatus of the present invention in the system.
Figure 7:
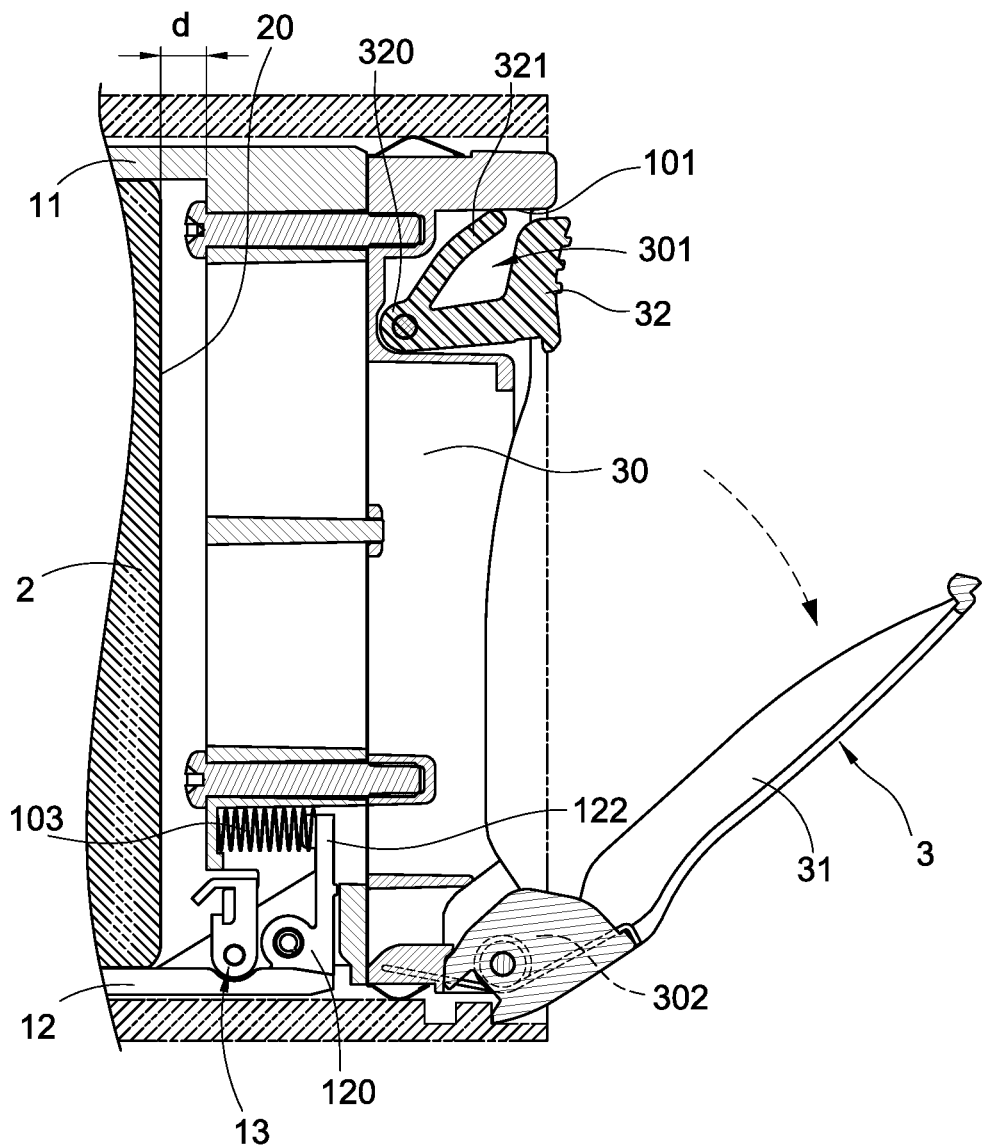
FIG. 7 is a schematic view of removing the memory storage unit and the carrying apparatus of the present invention from the system.

Please refer to FIGS. 1 and 2, which are the perspective view of the present invention and the partial perspective exploded view of the present invention, respectively. The present invention provides a carrying apparatus 1 used for a memory storage unit. The carrying apparatus 1 can carry the memory storage unit 2 (as shown in FIG. 6). Then, the carrying apparatus 1 together with the memory storage unit 2 is installed in a system (like a computer). Also, the memory storage unit 2 can be removed from the system (as shown in FIG. 7) when the carrying apparatus 1 is withdrawn. The carrying apparatus 1 is used for clamping the side edges of the memory storage unit 2 and comprises a base part 10, a fixed arm 11, and a holding arm 12.

Figure 4:
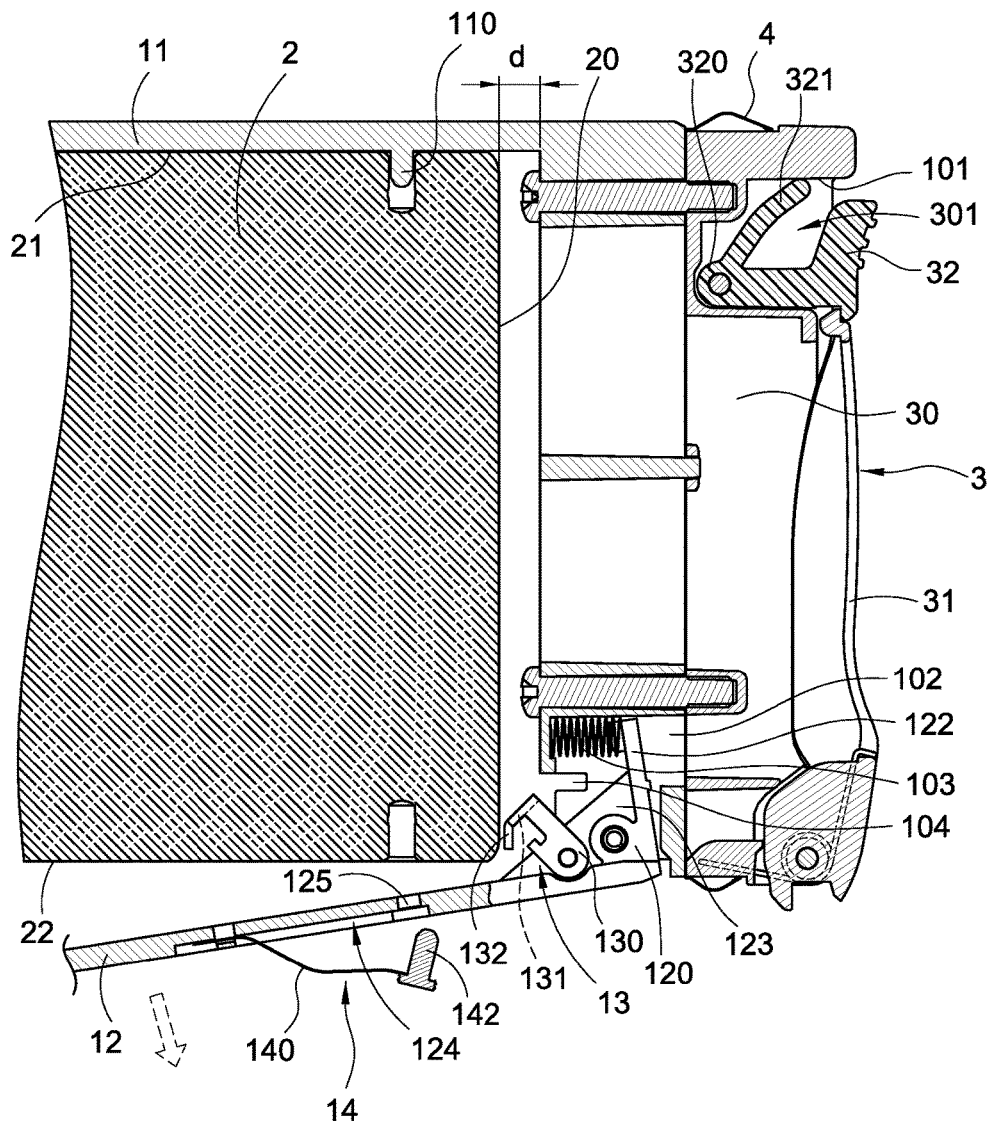
FIG. 4 is an operational view of the present invention before the memory storage unit is clamped.
Figure 5:
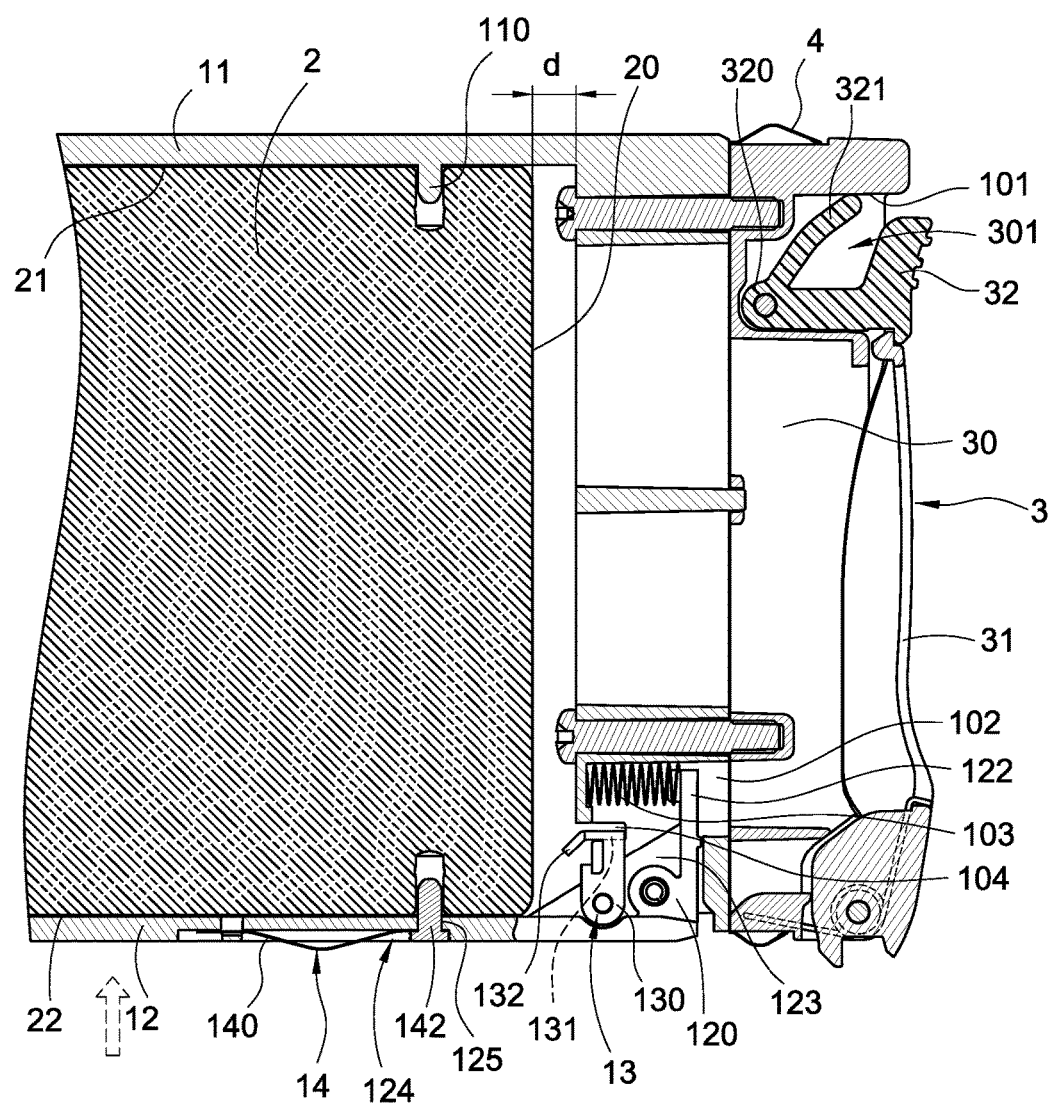
FIG. 5 is an operational view of the present invention after the memory storage unit is clamped.

The base part 10 is disposed corresponding to the first side edge 20 of the memory storage unit 2 and forms a letter "U" together with the fixed arm 11 and the holding arm 12. Please also refer to FIG. 4. The memory storage unit 2 can be a hard disk drive or a thinned hard disk drive with a thickness, for example, below 7 mm. The memory storage unit 2 has the first side edge 20, a second side edge 21, and a third side edge 22. The second and third side edges 21, 22 are individually next to the first side edge 20. The base part 10 is disposed corresponding to the first side edge 20. The base part 10 has the fixed end 100 adjacent to the second side edge 21 and the pivot end 101 adjacent to the third side edge 22. The fixed arm 11 extends from the fixed end 100 of the base part 10 to approach the second side edge 21 of the memory storage unit 2. The fixed arm 11 also can be provided with at least one bolt head 110 to be engaged with the screw holes predefined on the memory storage unit 2, as shown in FIG. 5. The holding arm 12 is pivoted on the pivot end 101 of the base part 10 and is spaced with the fixed arm 11. The above configuration of the base part 10, the fixed arm 11, and the holding arm 12 is shaped like a letter "U" such that the memory storage unit 2 can be received in the space defined between the fixed arm 11 and the holding arm 12.

In detail, the above-mentioned fixed arm 11 can be integrally formed with the base part 10. The holding arm 12 has a pivot portion 120 fitting with the pivot end 101 and is pivoted at the pivot end 101 and the pivot portion 120 around a pivot shaft 121 such that the holding arm 12 and the base part 10 are pivoted to each other.

As shown in FIG. 2, the base part 10 is provided with a working space 102. In an embodiment of the present invention, the working space 102 is adjacent to the pivot end 101 of the base part 10. The holding arm 12 is provided with a stop end 122 extending into the working space 102. The stop end 122 extends from the pivot portion 120. The elastic element 103 is disposed in the working space 102. The elastic element 103 exerts a force on the stop end 122 such that the holding arm 12 moves toward and clamps the third side edge 22 of the memory storage unit 2. In detail, as shown in FIGS. 4 and 5, the elastic element 103 can be a compression spring compressed between the inner wall of the working space 102 and the stop end 122. Thus, a spring force is provided to press the holding arm 12 against the third side edge 22 such that the holding arm 12 together with the fixed arm 11 provides a sufficient clamping force to place the memory storage unit 2 on the carrying apparatus 1.

Further, in the present invention, a carrying plate 123 is disposed close to the elastic element 103 and between the holding arm 12 and the stop end 122. The fastener 13 is pivoted on the carrying plate 123. The fastener 13 has a swing arm 130, a clamping portion 131 extending from the swing arm 130, and a pull portion 132 which can be pulled manually. The swing arm 130 is pivoted on the carrying plate 123 around the pivot part 133. As shown in FIGS. 4 and 5, when the holding arm 12 provides the flexible clamping force for the memory storage unit 2, the clamping portion 131 is snapped into the slot 104 of the base part 10 by pushing the fastener 13 to ensure that the holding arm 12 maintains the clamping force on the memory storage unit 2 and to prevent the holding arm 12 from moving outward to make the memory storage unit 2 be detached and separated from the holding arm 12. On the contrary, if the memory storage unit 2 needs replacement, the clamping portion 131 of the fastener 13 has to be withdrawn from the slot 104 in advance such that the holding arm 12 moves outward to detach the memory storage unit 2.

Furthermore, for the convenient positioning of the memory storage unit 2, the holding arm 12 is provided with a slit 124 in which a plug part 14 is disposed. The plug part 14 has a flexible rib 140, a supporting part 141 disposed at one end of the flexible rib 140, and a bolt head 142 disposed at the other end of the flexible rib 140. The supporting part 141 positions the flexible rib 140 in the slit 124. A bolt hole 125 is disposed in the slit 124 corresponding to the bolt head 142 such that the bolt head 142 passes through the bolt hole 125 to be plugged into the screw hole predefined on the memory storage unit 2, as shown in FIG. 5, which achieves better effects of assembly and fixing. Further, more bolt head 126 can be disposed corresponding to other screw holes predefined on the memory storage unit 2 to produces the effects of assembly and fixing.

Therefore, by means of the above configuration, the carrying apparatus used for the memory storage unit of the present invention can be obtained.

Figure 3:
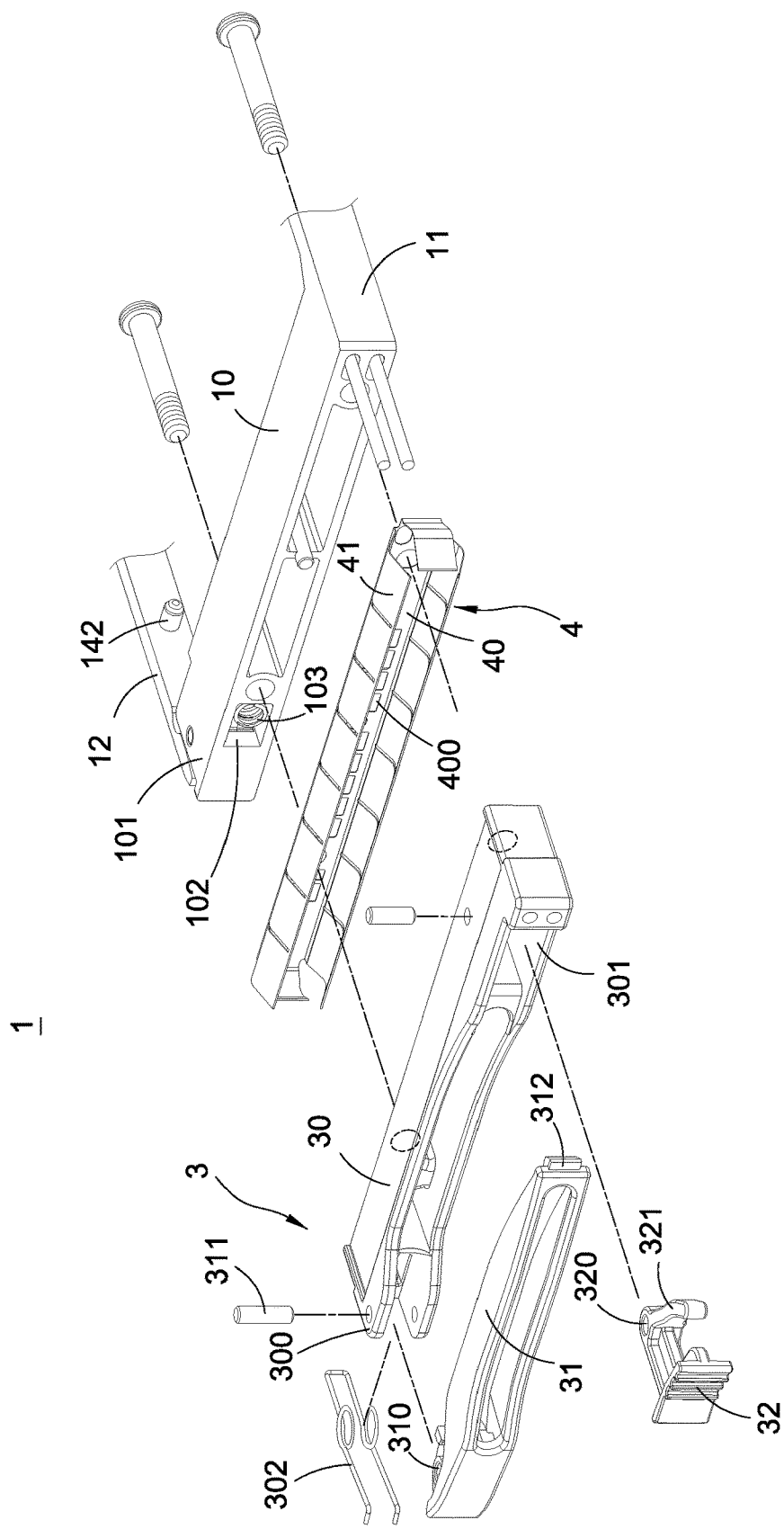
FIG. 3 is another perspective exploded view of the present invention from another view.

In addition, as shown in FIG. 3, for the convenient withdrawal of the carrying apparatus 1, the carrying apparatus 1 is further provided with a handle unit 3 disposed at the front end of the base part 10. The handle unit 3 comprises a handle seat 30, a handle 31 pivoted on the handle seat 30, and a snap button 32. A handle pivot 300 is disposed on one side of the handle 31 and a snap button recess 301 for receiving the snap button 32 is disposed on the front end surface of the other side of the handle 31. A handle pivot end 310 is disposed at one end of the handle 31 corresponding to the handle pivot 300. A handle pivot shaft 311 is disposed passing through the handle pivot 300 and the handle pivot end 310. In this way, the handle 31 is pivoted on the handle seat 30. Also, a torsion spring 302 can be disposed between the handle 31 and the handle seat 30 such that the handle 31 is kept out of the handle seat 30 in a normal state. A peg 312 is disposed at the other end of the handle 31. When the handle 31 is folded to the handle seat 30, the peg 312 is just opposite to the snap button 32 and snapped by the snap button 32 such that the handle 31 cannot spring out of the handle seat 30. The snap button 32 has a wrist 320 pivoted in the snap button recess 301 and a flexible arm 321 extending from the wrist 320 and pressing against the inner wall of the snap button recess 301. As shown in FIG. 6, when the user applies a force to the snap button 32, the flexible arm 321 is exerted by the force and deformed such that the snap button 32 is separated from the peg 312 of the handle 31 in which the spring force released from the torsion spring 302 springs the handle 31 out of the handle seat 30, as shown in FIG. 7. Then, the user holds the handle 31 to remove the carrying apparatus 1 from the system.

Please refer to FIG. 3 again. The present invention further comprises a covering part 4 disposed between the base part 10 and the handle unit 3. The covering part 4 has a base plate 40 attached to the front end surface of the base part 10 and a plurality of flexible sheets 41 extending from the perimeter of the base plate 40 and bending toward the handle unit 3. The base plate 40 is provided with a plurality of holes 400. As shown in FIG. 4. a distance d is reserved between the base part 10 and the first side edge 20 of the memory storage unit 2 to allow external air to flow through the holes 400, which provides air convection for the memory storage unit 2 and thus facilitates heat dissipation.

In summary, the present invention really achieves the expected objectives and overcomes the problems of the prior art. Also it is indeed novel, useful, and non-obvious to be patentable. Please examine the application carefully and grant it as a formal patent for protecting the rights of the inventor.

The embodiments disclosed in the description are only the preferred embodiments of the present invention, but not to limit the scope of the present invention. All the equivalent modifications applying the contents of the description and the accompanying figures are embraced within the scope of the present invention.

What is claimed is:
1. A carrying apparatus used for clamping side edges of a memory storage unit, comprising:
   a base part disposed corresponding to a first side edge of the memory storage unit and having a fixed end and a pivot end;
   a fixed arm extending from the fixed end of the base part; and
   a holding arm pivoted on the pivot end of the base part and spaced with the fixed arm,
   wherein the base part is provided with a working space in which an elastic element is disposed, wherein the holding arm is provided with a stop end extending into the working space, wherein the elastic element exerts a force on the stop end such that the holding arm moves toward and clamps a third side edge of the memory storage unit, and
   wherein a fastener is pivoted on the holding arm for fastening the holding arm to the base part, wherein the fastener has a swing arm and a clamping portion extending from the swing arm, wherein a slot is disposed on the base part such that the clamping portion is snapped into the slot.

2. The carrying apparatus used for clamping the side edges of the memory storage unit according to claim 1, wherein the fixed arm is integrally formed and extends from the fixed end.

3. The carrying apparatus used for clamping the side edges of the memory storage unit according to claim 1, wherein the holding arm has a pivot portion fitting with the pivot end and is pivoted at the pivot end and the pivot portion around a pivot shaft.

4. The carrying apparatus used for clamping the side edges of the memory storage unit according to claim 1, wherein the holding arm is provided with a plug part having a flexible rib, a supporting part disposed at one end of the flexible rib, and a bolt head disposed at the other end of the flexible rib.

5. The carrying apparatus used for clamping the side edges of the memory storage unit according to claim 4, wherein the holding arm has a slit in which the plug part is disposed, wherein a bolt hole is disposed in the slit corresponding to the bolt head for receiving the bolt head.

6. The carrying apparatus used for clamping the side edges of the memory storage unit according to claim 1, wherein the working place is disposed close to the pivot end.

7. The carrying apparatus used for clamping the side edges of the memory storage unit according to claim 1, wherein the stop end extends from the pivot portion.

8. The carrying apparatus used for clamping the side edges of the memory storage unit according to claim 1, wherein a carrying plate is disposed close to the elastic element and between the holding arm and the stop end, wherein the fastener is disposed on the carrying plate.

9. The carrying apparatus used for clamping the side edges of the memory storage unit according to claim 1, wherein the fastener is further provided with a pull portion.

10. The carrying apparatus used for clamping the side edges of the memory storage unit according to claim 1, further comprising a handle unit disposed at the front end of the base part.

11. The carrying apparatus used for clamping the side edges of the memory storage unit according to claim 10, wherein the handle unit comprises a handle seat, a handle pivoted on the handle seat, and a snap button, wherein a peg is disposed at one end of the handle corresponding to the snap button, wherein the snap button is used to fasten the peg.

12. The carrying apparatus used for clamping the side edges of the memory storage unit according to claim 11, wherein the handle seat is provided with a snap button recess in which the snap button is disposed.

13. The carrying apparatus used for clamping the side edges of the memory storage unit according to claim 1, further comprising a covering part disposed between the base part and the handle unit.

14. The carrying apparatus used for clamping the side edges of the memory storage unit according to claim 13, wherein the covering part has a base plate attached to a front end of the base part and a plurality of flexible sheets extending from the perimeter of the base plate and bending toward the handle unit.

15. The carrying apparatus used for clamping the side edges of the memory storage unit according to claim 14, wherein the base plate is provided with a plurality of holes, wherein a distance is reserved between the base part and the first side edge of the memory storage unit.

16. A carrying apparatus used for clamping side edges of a memory storage unit, comprising:
   a base part disposed corresponding to a first side edge of the memory storage unit and having a fixed end and a pivot end;
   a handle unit disposed at the front end of the base part
   a fixed arm extending from the fixed end of the base part; and
   a holding arm pivoted on the pivot end of the base part and spaced with the fixed arm,
   wherein the base part is provided with a working space in which an elastic element is disposed;
   wherein the holding arm is provided with a stop end extending into the working space;
   wherein the elastic element exerts a force on the stop end such that the holding arm moves toward and clamps a third side edge of the memory storage unit;
   wherein a fastener is pivoted on the holding arm for fastening the holding arm to the base part;
   wherein the handle unit comprises a handle seat, a handle pivoted on the handle seat, and a snap button, wherein a peg is disposed at one end of the handle corresponding to the snap button, wherein the snap button is used to fasten the peg;
   wherein the handle seat is provided with a snap button recess in which the snap button is disposed;
   wherein the snap button has a wrist pivoted in the snap button recess and a flexible arm extending from the wrist and pressing against the inner wall of the snap button recess.

* * * * *